United States Patent
Marupaduga

(10) Patent No.: US 11,843,983 B1
(45) Date of Patent: Dec. 12, 2023

(54) RE-DIRECTING A DUAL CONFIGURATION (NSA/SA) UE TO STANDALONE 5G NR NODE

(71) Applicant: T-MOBILE INNOVATIONS LLC, Overland Park, KS (US)

(72) Inventor: Sreekar Marupaduga, Overland Park, KS (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 139 days.

(21) Appl. No.: 17/395,776

(22) Filed: Aug. 6, 2021

(51) Int. Cl.
 *H04W 36/08* (2009.01)
 *H04W 36/00* (2009.01)
 *H04W 52/02* (2009.01)
 *H04W 36/22* (2009.01)

(52) U.S. Cl.
 CPC ....... *H04W 36/0069* (2018.08); *H04W 36/08* (2013.01); *H04W 36/22* (2013.01); *H04W 52/0261* (2013.01)

(58) Field of Classification Search
 None
 See application file for complete search history.

(56) References Cited

U.S. PATENT DOCUMENTS

| | | | | |
|---|---|---|---|---|
| 2018/0332659 A1* | 11/2018 | Hwang | ................ | H04W 24/10 |
| 2018/0376383 A1* | 12/2018 | Belghoul | ............. | H04W 76/16 |
| 2019/0200375 A1* | 6/2019 | Yasukawa | ........... | H04W 72/566 |
| 2020/0119883 A1* | 4/2020 | Skarve | ................... | H04L 5/0032 |
| 2020/0205213 A1* | 6/2020 | Marco | ................... | H04W 28/08 |
| 2020/0213939 A1* | 7/2020 | Nimbavikar | .......... | H04W 28/16 |
| 2020/0322854 A1* | 10/2020 | Ryoo | ................ | H04W 36/0085 |
| 2021/0005080 A1* | 1/2021 | Ogawa | ................... | H04W 24/02 |
| 2021/0160945 A1* | 5/2021 | Abdel Shahid | ....... | H04W 76/16 |
| 2022/0086689 A1* | 3/2022 | Abdel Shahid | ....... | H04W 76/15 |
| 2022/0248442 A1* | 8/2022 | Meylan | ................. | H04L 1/1874 |
| 2022/0345955 A1* | 10/2022 | Lin | .................... | H04W 36/0011 |
| 2022/0386222 A1* | 12/2022 | Akdim | .............. | H04W 36/0066 |
| 2022/0394718 A1* | 12/2022 | Zhou | ....................... | H04L 5/001 |
| 2022/0394775 A1* | 12/2022 | Ratasuk | ................ | H04W 48/16 |
| 2023/0016744 A1* | 1/2023 | Low | .................. | H04W 36/0044 |

\* cited by examiner

*Primary Examiner* — Kodzovi Acolatse
(74) *Attorney, Agent, or Firm* — SHOOK, HARDY & BACON L.L.P.

(57) ABSTRACT

Systems and methods are provided for dynamically re-directing a wireless communication deice to improve spectral efficiency, load balancing, and battery life. The system comprises at least a first node and a second node that are each configured to communicate with one or more devices in a service area. The system receives an indication that a first device is connected to the first node and then receives a real-time buffer status report for the first UE which indicates how much data is being transmitted by the device. Based on determining that the real-time buffer status of the device is below a predetermined buffer status report threshold, the system dynamically re-directs the device to disconnect from the first node and connect to the second node.

16 Claims, 4 Drawing Sheets

RE-DIRECTING A DUAL CONFIGURATION (NSA/SA) UE TO STANDALONE 5G NR NODE

TECHNICAL FIELD

The present invention relates to the use of a system for dynamically re-directing a dual configuration wireless communication device from a first node to a second node, substantially as shown in and/or described in connection with at least one of the figures, and as set forth more completely in the claims.

SUMMARY

A high-level overview of various aspects of the present technology is provided in this section to introduce a selection of concepts that are further described below in the detailed description section of this disclosure. This summary is not intended to identify key or essential features of the claimed subject matter, nor is it intended to be used as an aid in isolation to determine the scope of the claimed subject matter.

In aspects set forth herein, systems and methods are provided for re-directing a user equipment (UE) from a first node to a second node. Traditionally, a 5G and LTE capable UE automatically attach to both the LTE and 5G carrier, which results in higher power consumption for the UE. In this case, the UE's battery life may be negatively impacted because it is having to communicate with both the 5G and LTE antennas.

The present system addresses this problem by dynamically re-directing a dual configuration UE from a non-standalone EN-DC node to a standalone 5G node, thereby increasing battery life for the UE and optimizing resource allocation for the network.

BRIEF DESCRIPTION OF THE SEVERAL VIEWS OF THE DRAWINGS

Implementations of the present disclosure are described in detail below with reference to the attached drawing figures, wherein.

DETAILED DESCRIPTION

Figure 1:
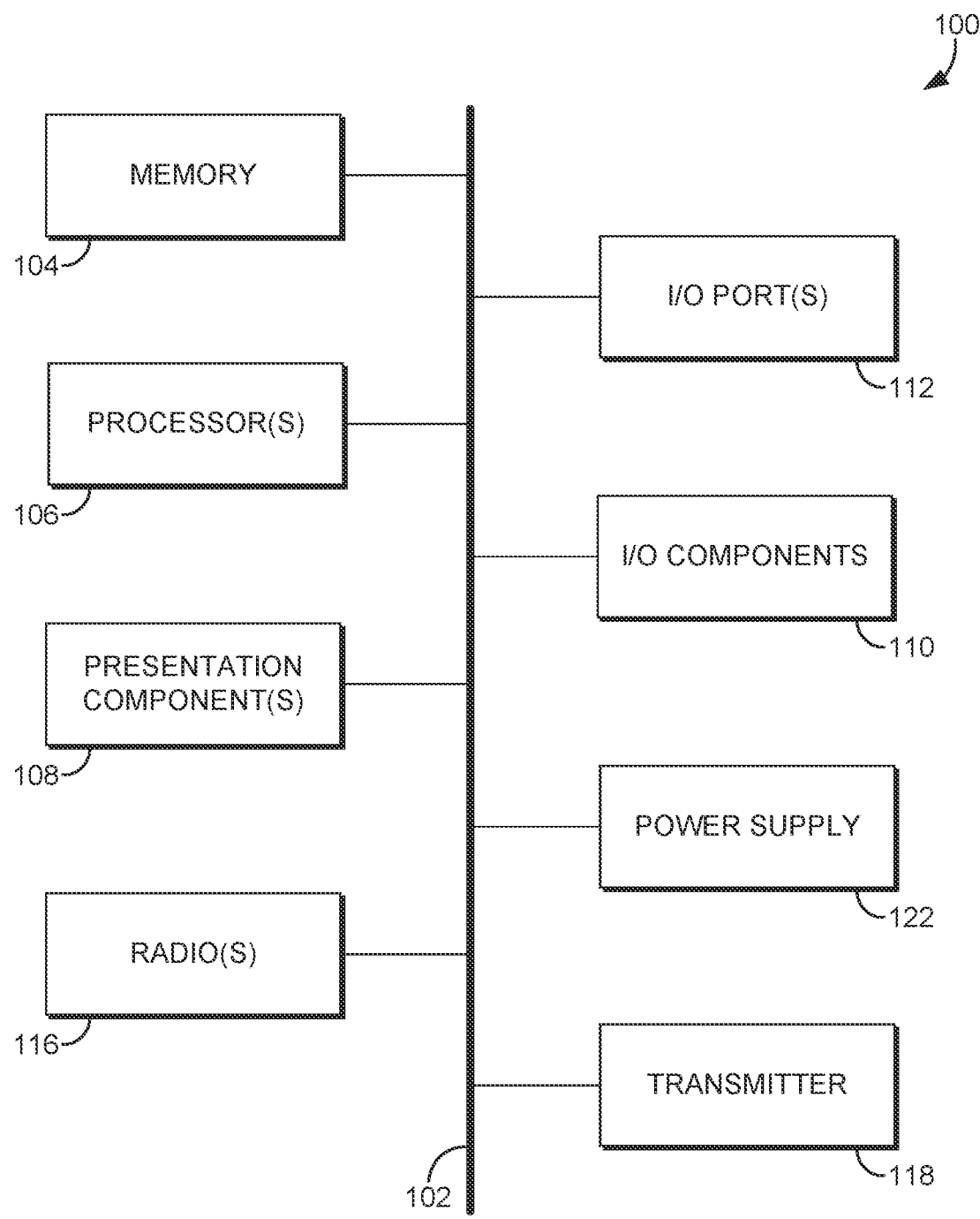
FIG. 1 depicts a diagram of an exemplary computing environment suitable for use in implementations of the present disclosure, in accordance with aspects herein.

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. Various technical terms are used throughout this description. An illustrative resource that fleshes out various aspects of these terms can be found in Newton's Telecom Dictionary, 25th Edition (2009).

As used herein, the term "node" is used to refer to network access technology, such as eNode, gNode, etc. In other aspects, the term "node" may be used to refer to one or more antennas being used to communicate with a user device.

Embodiments of the present technology may be embodied as, among other things, a method, system, or computer-program product. Accordingly, the embodiments may take the form of a hardware embodiment, or an embodiment combining software and hardware. An embodiment takes the form of a computer-program product that includes computer-useable instructions embodied on one or more computer-readable media.

Computer-readable media include both volatile and non-volatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules 13 in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, a traditional telecommunications network employs a plurality of base stations (i.e., cell sites, cell towers) to provide network coverage. The base stations are employed to broadcast and transmit transmissions to user devices of the telecommunications network. An access point may be considered to be a portion of a base station that may comprise an antenna, a radio, and/or a controller. In aspects, an access point is defined by its ability to communicate with a user equipment (UE), such as a wireless communication device (WCD), according to a single protocol (e.g., 3G, 4G, LTE, 5G, and the like); however, in other aspects, a single access point may communicate with a UE according to multiple protocols. As used herein, a base station may comprise one access point or more than one access point. Factors that can affect the telecommunications transmission include, e.g., location and size of the base stations, and frequency of the transmission, among other factors. The base stations are employed to broadcast and transmit transmissions to user devices of the telecommunications network. Traditionally, the base station establishes uplink (or downlink) transmission with a mobile handset over a single frequency that is exclusive to that particular uplink connection (e.g., an LTE connection with an EnodeB). In this regard, typically only one active uplink connection can occur per frequency. The base station may include one or more sectors served by individual transmitting/receiving components associated with the base station (e.g., antenna arrays controlled by an EnodeB). These transmitting/receiving components together form a multi-sector broadcast arc for communication with mobile handsets linked to the base station.

As employed herein, a UE (also referenced herein as a user device) or WCD can include any device employed by an end-user to communicate with a wireless telecommunications network. A UE can include a mobile device, a mobile broadband adapter, or any other communications device employed to communicate with the wireless telecommunications network. A UE, as one of ordinary skill in the art may appreciate, generally includes one or more antenna coupled to a radio for exchanging (e.g., transmitting and receiving) transmissions with a nearby base station.

In aspects, a UE provides location and channel quality information to the wireless communication network via the access point. Location information may be based on a current or last known position utilizing GPS or other satellite location services, terrestrial triangulation, an access point's physical location, or any other means of obtaining coarse or fine location information. Channel quality information may indicate a realized uplink and/or downlink transmission data rate, observed signal-to-interference-plus-noise ratio (SINR) and/or signal strength at the user device, or throughput of the connection. Channel quality information may be provided via, for example, an uplink pilot time slot, downlink pilot time slot, sounding reference signal, channel quality indicator (CQI), rank indicator, precoding matrix indicator, or some combination thereof. Channel quality information may be determined to be satisfactory or unsatisfactory, for example, based on exceeding or being less than a threshold. Location and channel quality information may take into account the user device capability, such as the number of antennas and the type of receiver used for detection. Processing of location and channel quality information may be done locally, at the access point or at the individual antenna array of the access point 0. In other aspects, the processing of said information may be done remotely.

Generally speaking, many modern UEs comprise at least two transmitters; in some configurations, a UEs may operate using dual connectivity. That is, the UE may use at least a first of its transmitters to communicate a first uplink signal to a first node at an access point and at least a second of its transmitters to communicate a second uplink signal to a second node at the access point. In other configurations, a UE may operate using single connectivity, wherein it uses one or more of its transmitters to communicate with a single access point, base station, or cell site at one or more nodes. Whether using dual connectivity or single connectivity, a UE may have a pre-set maximum total uplink power (as will be discussed in greater detail below). Conventionally, a communication session between a UE and an access point comprises an uplink handshake, wherein the uplink handshake is an uplink signal from the UE to an access point, conventionally transmitted at the pre-set maximum uplink power. Once the handshake occurs, the network and/or the device may determine that the uplink power may be reduced (e.g., if, based on proximity or line of sight, it is determined that only half of the maximum pre-set uplink power is necessary to effectively propagate the uplink signal to the access point). The opposite, UE may not increase the power of the transmission (it may retry again later or attempt to connect to a different access point, for example).

The present disclosure is directed to systems, methods, and computer readable media for providing an improved connection of a UE to a specific node based on one or more criteria, including a buffer status report. In heterogeneous networks a UE may have been located in an area of overlapping coverage served by physical cell IDs (PCIs) from a 5G NR standalone cell and a 5G non-standalone node. In the current implementations, a UE connects to a particular node based on a reference signal received power (RSRP) threshold. However, this current practice is not optimal in many instances where a UE is assigned to a non-standalone node as the UE needs to be served by both the LTE radio access technology (RAT) and the 5G NR RAT. As a result, the UE's battery life is used faster and optimal battery life is not achieved due to the interaction of the UE with both the LTE and 5G node. As such, a system in which a UE is dynamically re-directed from a non-standalone node to a standalone node in the event that the UE buffer status report is below a defined threshold would result in longer battery life for the UE. This will ensure that UEs with lower battery life are able to transmit all the necessary data and also optimizes resource utilization and allows for reprioritization of load balancing between a non-standalone and stand-alone node.

A first aspect of the present disclosure is directed to a system for re-directing a dual configuration UE. The system comprises a first node that is configured to wirelessly communicate with one or more UEs in a geographic service area. The system also comprises one or more processors configured to receive an indication that a first UE is connected to the first node, and receive a real time buffer status report of the first UE. Based on the real-time buffer status report for the first UE, the system determines whether the first UE's buffer status is below a first predetermined buffer status threshold. In response to determining that the first UE's buffer status is below the first predetermined buffer status threshold, the system will dynamically re-direct the first UE to connect to a second node. In embodiments, the first node may be a non-standalone node that utilizes a first wireless communication protocol. The first wireless communication protocol may be a 5G EN-DC. Additionally, the second node may be a standalone node that utilizes a second wireless communication protocol. In this case, the second communication protocol may be 5G. By re-directing the first UE to the second node, the battery life of the first UE is lengthened. Additionally, in aspects the first node may have a greater signal strength than the second node. In other aspects, the second node may have a greater signal strength than the first node or both the first node and the second node may have the same signal strength. Additionally, the processors are configure to determine an amount of data that is transmitted by the first UE and a predetermined data transmission threshold value. In response, the system determines that the amount of data transmitted by the first UE is below the predetermined data transmission threshold value.

In addition to the buffer status report, in aspects, the system may be further configured to receive an indication that a second UE has connected to the first node and receive a real-time buffer status report for the second UE. Based on the real-time buffer status report of the second UE, the system will determine whether the second UE's buffer status is below a second predetermined buffer status threshold. The buffer status threshold for the second UE may be different or the same as the buffer status threshold for the first UE. In response to determining that the second UE's buffer status is above the second predetermined threshold, the second UE is directed to remain connected to the first node. By contrast, if the second UE's buffer status report is below the second predetermined threshold, the second UE may similarly be re-directed from the first node to the second node.

A second aspect of the present disclosure is directed to a method for re-directing a dual configuration UE. An indication that a first UE has connected to a first node is received and then a buffer status report for the first UE is received. Based on the real-time buffer status report for the first UE, whether the first UE's buffer status is below a first predetermined buffer status threshold is determined. Then, in response to determining that the first UE's buffer status is below the first predetermined buffer status threshold, dynamically re-directing the first UE to connect to a second node.

In aspects, the method further includes an indication that a second UE has connected to the first node is received and a real-time buffer status report for the second UE is also received. Based on the real-time buffer status report for the second UE, whether the second UE's buffer status is above a second buffer status predetermined threshold is determined. Then, in response to determining that the second UE's buffer status is above the second buffer status predetermined threshold, the second UE is directed to remain connected to the first node.

Another aspect of the present disclosure is directed to a system for dynamically re-directing a dual configuration wireless UE. This system comprises a first non-standalone node configured to wirelessly communicate with one or more UEs in a geographic service area and one or more processors configured to perform various operations including receiving an indication that a first UE has connected to the first non-standalone node. A historical buffer status report for the first UE is received and the one or more processors determine whether the first UE's buffer status from the historical buffer status report is below a first predetermined buffer status threshold. In response to determining that the first UE's buffer status is below the first predetermined buffer status threshold, the first UE is dynamically re-directed to connect to a second standalone node. It is further contemplate that in aspects, prior to receiving the historical buffer status report for the first UE, the one or more processors are further configured to determine that one or more additional UEs are connected to the first non-standalone node at the same time that the first UE is connected to the first non-standalone node. The system is configured to calculate a total number of WCDs connected to the first non-standalone node and determine that the total number of WCDs connected to the first non-standalone node is above a predetermined load threshold for the first non-standalone node.

Turning to FIG. 1, a diagram is depicted of an exemplary computing environment suitable for use in implementations of the present disclosure. In particular, the exemplary computer environment is shown and designated generally as computing device 100. Computing device 100 is but one example of a suitable computing environment and is not intended to suggest any limitation as to the scope of use or functionality of the invention. Neither should computing device 100 be interpreted as having any dependency or requirement relating to any one or combination of components illustrated. In aspects, the computing device 100 may be a UE, or other user device, capable of two-way wireless communications with an access point. Some non-limiting examples of the computing device 100 include a cell phone, tablet, pager, personal electronic device, wearable electronic device, activity tracker, desktop computer, laptop, PC, and the like.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 1, computing device 100 includes bus 102 that directly or indirectly couples the following devices: memory 104, one or more processors 106, one or more presentation components 108, input/output (I/O) ports 112, I/O components 110, power supply 122, radio 116, and transmitter 118. Bus 102 represents what may be one or more busses (such as an address bus, data bus, or combination thereof). Although the devices of FIG. 1 are shown with lines for the sake of clarity, in reality, delineating various components is not so clear, and metaphorically, the lines would more accurately be grey and fuzzy. For example, one may consider a presentation component such as a display device to be one of I/O components 110. Also, processors, such as one or more processors 106, have memory. The present disclosure hereof recognizes that such is the nature of the art, and reiterates that FIG. 1 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 1 and refer to "computer" or "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 104 includes computer-storage media in the form of volatile and/or nonvolatile memory. Memory 104 may be removable, nonremovable, or a combination thereof. Exemplary memory includes solid-state memory, hard drives, optical-disc drives, etc. Computing device 100 includes one or more processors 106 that read data from various entities such as bus 102, memory 104 or I/O components 110. One or more presentation components 108 presents data indications to a person or other device. Exemplary one or more presentation components 108 include a display device, speaker, printing component, vibrating component, etc. I/O ports 112 allow computing device 100 to be logically coupled to other devices including I/O components 110, some of which may be built into computing device 100. Illustrative I/O components 110 include a microphone, joystick, game pad, satellite dish, scanner, printer, wireless device, etc.

The radio 116 represents one or more radios that facilitate communication with a wireless telecommunications network. While a single radio 116 is shown in FIG. 1, it is contemplated that there may be more than one radio 116 coupled to the bus 102. In aspects, the radio 116 utilizes a transmitter 118 to communicate with the wireless telecommunications network. It is expressly conceived that a computing device with more than one radio 116 could facilitate communication with the wireless telecommunications network via both the first transmitter 118 and an additional transmitters (e.g. a second transmitter). Illustrative wireless telecommunications technologies include CDMA, GPRS, TDMA, GSM, and the like. The radio 116 may additionally or alternatively facilitate other types of wireless communications including Wi-Fi, WiMAX, LTE, 3G, 4G, LTE, 5G, NR, VoLTE, or other VoIP communications. As can be appreciated, in various embodiments, radio 116 can be configured to support multiple technologies and/or multiple radios can be utilized to support multiple technologies. A wireless telecommunications network might include an array of devices, which are not shown so as to not obscure more relevant aspects of the invention. Components such as a base station, a communications tower, or even access points (as well as other components) can provide wireless connectivity in some embodiments.

Figure 2:
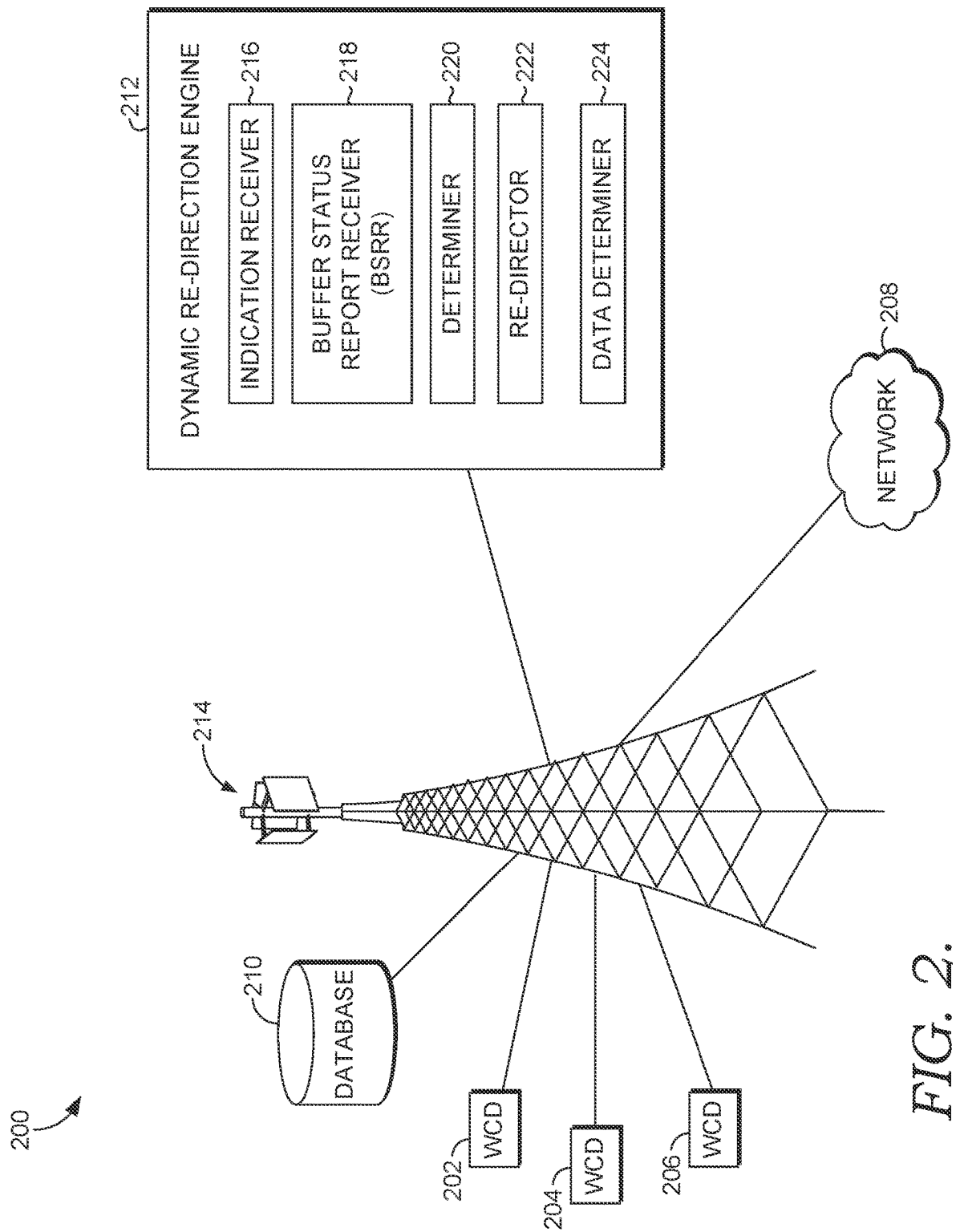
FIG. 2 illustrates a diagram of an exemplary network environment in which implementations of the present disclosure may be employed, in accordance with aspects herein.

Next, FIG. 2 provides an exemplary network environment in which implementations of the present disclosure may be employed. Such a network environment is illustrated and designated generally as network environment 200. Network environment 200 is but one example of a suitable network environment and is not intended to suggest any limitation as to the scope of use or functionality of the invention. Neither should the network environment be interpreted as having any dependency or requirement relating to any one or combination of components illustrated.

Network environment 200 includes UEs 202, 204, and 206, access point 214 (which may be a cell site, base station, or the like), network 208, database 210, and dynamic re-direction engine 212. In network environment 200, user devices may take on a variety of forms, such as a personal computer (PC), a user device, a smart phone, a smart watch, a laptop computer, a mobile phone, a mobile device, a tablet computer, a wearable computer, a personal digital assistant (PDA), a server, a CD player, an MP3 player, a global positioning system (GPS) device, a video player, a handheld communications device, a workstation, a router, a hotspot, and any combination of these delineated devices, or any other device (such as the computing device 100) that communicates via wireless communications with the access point 214 in order to interact with a public or private network.

In some aspects, the UEs 202, 204, and 206 can correspond to computing device 100 in FIG. 1. Thus, a user device can include, for example, a display(s), a power source(s) (e.g., a battery), a data store(s), a speaker(s), memory, a buffer(s), a radio(s) and the like. In some implementations, for example, a UE 202 comprises a wireless or mobile device with which a wireless telecommunication network(s) can be utilized for communication (e.g., voice and/or data communication). In this regard, the user device can be any mobile computing device that communicates by way of a wireless network, for example, a 3G, 4G, 5G, LTE, CDMA, or any other type of network.

In some cases, the UEs 202, 204, and 206 in network environment 200 can optionally utilize network 208 to communicate with other computing devices (e.g., a mobile device(s), a server(s), a personal computer(s), etc.) through access point 214. The network 208 may be a telecommunications network(s), or a portion thereof. A telecommunications network might include an array of devices or components (e.g., one or more base stations), some of which are not shown. Those devices or components may form network environments similar to what is shown in FIG. 2, and may also perform methods in accordance with the present disclosure. Components such as terminals, links, and nodes (as well as other components) can provide connectivity in various implementations. Network 208 can include multiple networks, as well as being a network of networks, but is shown in more simple form so as to not obscure other aspects of the present disclosure.

Network 208 can be part of a telecommunication network that connects subscribers to their immediate service provider. In some instances, network 208 can be associated with a telecommunications provider that provides services (e.g., LTE) to user devices, such as UE 202. For example, network 208 may provide voice, SMS, and/or data services to user devices or corresponding users that are registered or subscribed to utilize the services provided by a telecommunications provider. Network 208 can comprise any communication network providing voice, SMS, and/or data service(s), such as, for example, a 1x circuit voice, a 3G network (e.g., CDMA, CDMA2000, WCDMA, GSM, UMTS), a 4G network (WiMAX, LTE, HSDPA), or a 5G network.

In some implementations, access point 214 is configured to communicate with a UE, such as UE 202, that is located within the geographical area, or cell, covered by radio antennas of access point 214. Cell site or access point 214 may include one or more base stations, base transmitter stations, radios, antennas, antenna arrays, power amplifiers, transmitters/receivers, digital signal processors, control electronics, GPS equipment, and the like. In particular, access point 214 may selectively communicate with the user devices using dynamic beamforming.

As shown, access point 214 is in communication with dynamic re-direction engine 212, which comprises various components that are utilized, in various implementations, to perform methods for dynamically redirecting a dual configuration UE from one node to another node to improve the UE's battery life, optimize resource allocation, and allow for reprioritization of load balancing between multiple nodes. In some implementations, dynamic re-direction engine 212 comprises components including an indication receiver 216, a buffer status report receiver (BSRR) 218, a determiner 220, a re-director 222, and a data determiner 224. However, in other implementations, more or less components than those shown in FIG. 2 may be utilized to carry out aspects of the invention described herein.

The indication receiver 216 of the dynamic re-direction engine 212 may receive an indication that a first UE is connected to a first node. When the indication receiver 216 receives the indication that a first UE is connected to a first node, indication receiver 216 may also receive an indication of whether the first node is a standalone node (SA) or a non-standalone node (NSA). A non-standalone node is defined as is a 5G series that does not stand alone—e.g., it is built over an existing 4G network. A UE connected to an NSA node utilizes the 5G radio infrastructure while the control functions, such as signaling, use the existing 4G LTE core network. When a UE utilizes an NSA node, more resources are being used since the UE is utilizing both the 5G and 4G LTE structures, which results in more use of the UE's battery, thereby decreasing the UE's battery life. By contrast, a standalone node allows completely independent operation of a 5G service without any interaction with an existing 4G network. SA nodes are advantageous as it ensures UEs with low battery life are able to transmit all the data required and result in better network performance.

When the first node is an NSA node, the node may utilize a first communication protocol. The first communication protocol may be a 5G EN-DC. As such, when the indication receiver 216 receives an indication that the first UE has connected to a first node, the indication received by the indication receiver will also include data indicating whether the first node is an NSA node or an SA node and the type of wireless communication protocol being utilized by the first node (e.g. 5G EN-DC, 4G LTE, 5G, etc.). For example, indication receiver 216 may receive an indication that the first UE has connected to the first node, such as an NSA node utilizing a first communication protocol, such as 5G EN-DC.

After the indication receiver 216 receives the indication that the first UE has connected to a first node, the BSRR 218 receives a buffer status report for the first UE. Historically, if the buffers status report receiver 218 received a report that indicated that the UE experienced low buffer status on a consistent basis, the first UE would connect to a particular node based on an RSRP threshold. In this case, the UE would connect to the node that has a higher signal strength. However, this was not always optimal, as a UE might be connected to an NSA node where the UE needs to be served by both the 5G and 4G LTE nodes, which then uses more battery life since data is being transmitted on both antennas. This does not optimize battery use because of the interaction of the UE with both the 5G and 4G LTE nodes.

Additionally, BSRR 218 may also define a buffer status threshold for each report received. For example, the BSRR 218 may determine that a real-time buffer status received for the first UE ranges from high to medium to low. The BSRR 218 may also define a first predetermined buffer status threshold value for the buffer status report. As such, when the BSRR 218 receives the buffers status report for the first UE, it may already know what the predetermined buffer status threshold value is. In aspects, the BSRR may define the predetermined buffer status threshold value as a number between 1-100. For example, if the BSRR determines the predetermined buffer status threshold value is 75, then any buffer status report indicating that the UE's buffer status is below 75 would fall below the threshold while any buffer status above 75 would be above the predetermined threshold.

The determiner 220 analyzes the buffer status report received by the BSRR 218 and then determines whether the first UE's buffers status is below a first predetermined buffer status threshold. If the determiner 220 determines that the buffer status for the first UE received by the BSRR 218 is above or equal to the predetermined buffer status report threshold, then no action will be taken. The first UE will remain connected to the first node and the process will be complete. However, when the determiner 220 determines that the first UE's buffer status is below the first predetermined buffer status threshold, further action will be prompted. When this occurs, the re-director 222 will dynamically re-direct the first UE to connect to a second node. When this happens, the first UE will disconnect from the first node (e.g. NSA node) and connect to the second node (e.g. SA node). In the present example, when the UE disconnects from the NSA node and connects with the SA node, it will result in increased battery life since the UE is no longer connected to both 5G and 4G LTE, thereby using less resources to communicate. Additionally, the re-direction by the re-director 222 also results in better load balancing in a coverage area as well as more optimal resource utilization.

In some aspects, the dynamic re-direction engine also includes a data determiner 224. In implementations, the data determiner 224 determines an amount of data that is transmitted by the first UE and also determines a predetermined data transmission threshold value. Using this data, the data determiner 224 determines whether the amount of data transmitted by the first UE is below the predetermined data transmission threshold value. If it is determined that the amount of data transmitted by the first UE is below the predetermined data transmission threshold, the re-director 222 may re-direct the first UE to disconnect from the first NSA node and connect to the second, SA node since the UE is not transmitting a lot of data. By contrast, if the data transmitted by the first UE is determined to be above the predetermined data transmission threshold, then the re-director 222 may take no action and my leave the first UE connected to the first, NSA node. While in the present example, the first node is referred to as the NSA node and the second node is being referred to as the SA node, it is contemplated that the first node could also be an SA node and the second node might be an NSA node. Any and all variations are contemplated herein.

In further implementations, the dynamic re-direction engine 12 may, via the indication receiver 216, also receive an indication that a second UE has connected to the first node. Such indication may be received by the indication receiver 216 at the same time or any time after the indication receiver 216 received the indication that a first UE has connected to the first node. In some instances it is contemplated that the indication receiver 216 may also receive an indication that a second UE has also connected to the first node. In other instances, the indication receiver 216 can receive individual, separate indications for each UE that connects to any node within the coverage area.

After receiving the indication that a second UE has connected to the first node, the BSRR 218 receives a real-time buffer status report for the second UE. Each individual UE will have its own buffer status report that is received by the BSRR 218. The determiner 220 will determine whether the real-time buffer status report for the second UE is above or below a second predetermined buffer status threshold. The second predetermined buffer status threshold is also determined by the BSRR 216. It is contemplated that each UE connected to the first node may have a different predetermined buffer status threshold associated with it. It is also contemplated that the first predetermined buffer status threshold and the second predetermined buffer status threshold may be the same.

If the determiner 220 determines that the second UE's buffer status report is above the second predetermined buffer status threshold, the re-director 222 will direct the second UE to remain at the first node. Continuing with the example of the first node being an NSA node, the second UE would remain connected to the NSA node. By contrast, if the determiner 220 determined that the second UE's buffer status was below the second predetermined buffer status threshold, the re-director 222 may re-direct the second UE to disconnect from the NSA node and connect to the second, SA node within the coverage area in order to optimize battery life and resource allocation.

It is further contemplated that in some instances, the BSRR 218 may receive a historical buffer status report in addition to the real-time buffer status report received for each UE. For example, the BSRR 218 can receive a historical buffer status report for the first UE and then the determiner 220 may utilize the additional data to determine whether the re-director 222 should re-direct the first UE from the first node to the second node. This may occur, for example, when a historic buffer report shows that the first UE's buffer status has consistently been above the first predetermined buffer status threshold and that only the current, real-time buffer status report indicates that the first UE's buffer status is below the first predetermined buffer status threshold. In this case, the determiner 220 may decide to have the first UE remain at the first node for the time being or may signal to the dynamic re-direction engine 212 that the indication receiver 216 needs to receive at least one more subsequent real-time buffer status report for the UE in order to make a determination about whether the UE should disconnect from the first node and reconnect to the second node. Further, while the present systems and methods describe receiving a single buffer status report for a UE, it is contemplated that in some aspects, the system may be configured so that multiple buffer status reports are received by the BSRR 218 over a predetermined time frame and that such reports are collectively analyzed to determine whether the UE should be redirected to the second node. It is contemplated that in these instances, the buffer status for a UE may be averaged and then the determiner 220 may determine whether the average buffer status for the UE is above or below the predetermined buffer status threshold.

In yet some other aspects, when the BSRR 218 receives additional buffer status reports for a UE over a period of time, it can result in multiple determinations of whether the buffer status is above or below a predetermined threshold. As previously mentioned, the pre-determined threshold may be static or may change based on a variety of factors, such as the number of user's present in the coverage area. As such, it is possible that there may be instances in which the first UE was re-directed from the first node (NSA node) to the second (SA) node and then is later re-directed back to the first, NSA node based on a subsequent buffer status report in which the determiner 220 has determined that the buffer status is now above the predetermined threshold. In other instances, even if the determiner 220 has determined that the predetermined buffer status threshold is exceeded by the UE in subsequent buffer status reports received, the re-director 222 may take no action and leave the UE connect at the second node. This may occur, for example, when the sector is heavily loaded and several other UEs are already connected to the first, NSA node.

Figure 3:
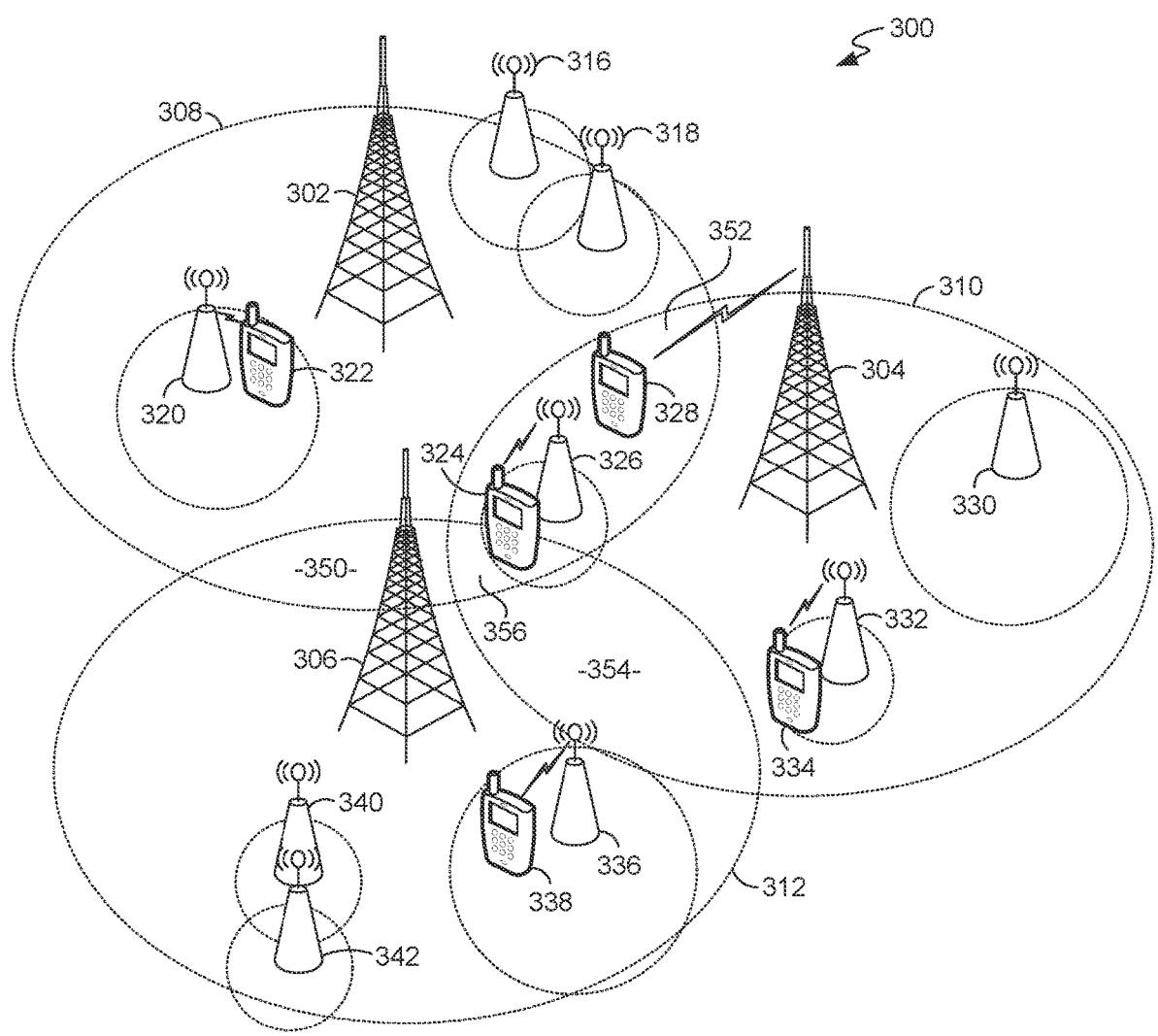
FIG. 3 illustrates a scenario with an example UE that may be re-directed from a first, NSA node to a second, SA node.

Next, FIG. 3, illustrates a scenario in which an example UE may be re-directed from a first, NSA node to a second, SA node, in accordance with aspects herein and is not intended to suggest any limitations as to the scope of use or functionality of embodiments described herein. Neither should the configuration be interpreted as having any dependency or requirement relating to any one or combination of components illustrated. In the scenario 300 shown in FIG. 3, three nodes 302, 304, and 306 are shown. Each individual node has a corresponding coverage area. For example, node 302's coverage area includes the area within area 308, node 304's coverage area includes the area within area 310, and node 306's coverage area includes the area within area 312. There are multiple UEs shown, including UE 322, UE 324, UE 328, UE 33, and UE 338, which are located within the different coverage areas 308, 310, and 312.

As shown, the three coverage areas 308, 310, and 312 overlap one another. For example, coverage area 308 corresponding to node 302 overlaps with coverage area 312 corresponding to node 306 in the area labeled 350. Similarly, the coverage area 308 for node 302 overlaps with the coverage area 310 of node 304 in the area labeled 352 and the coverage area for node 306 overlaps with the coverage area 310 for node 304 in the area labeled 354. All three coverage areas 308, 310, and 312 overlap one another in the area labeled 356.

In the example scenario shown in FIG. 3, node 302 is a standalone node. In this instance, the standalone node is a 5G node. By contrast, node 306 is a 5G EN-DC NSA node. The assignment of nodes are for exemplary purposes only and it is contemplated that in other instances there may be a different combination of non-standalone and standalone nodes. As can be seen, UE 324 is located in common coverage area 356. UE 324 is a dual and single RAT capable UE. Since UE 324 is located in common coverage area 356, UE 324 is able to see a signal from node 306 (5G EN-DC capable non-standalone node) and node 302 (5G standalone node).

Previously, when a UE, such as UE 324, sees two different signals, the UE would be assigned to the node with the higher signal strength or whichever node has the better RSRP. As such, prior to the implementation discussed herein, UE 324 would connect to node 306 if the signal strength is detected to be higher from node 306, which is the 5G EN-DC NSA node. However, in instances when the data to download or upload by UE 324 is low, such a connection would lead to consumption of more power which leads to depleting the battery life of the UE 324 faster. As previously mentioned, this occurs because the UE 324 has to transmit on both the 4G LTE and 5G antennas (4G LTE controls the signaling while 5G controls the data).

To resolve this issue and avoid the waste of resources and battery life, in the present implementation discussed herein, if a common coverage area, such as area 356, is present and the SA node signal strength is within a certain delta of the NSA node signal strength, the throughput speeds will not be affected since there is not much data to be transmitted. Based on the determination that UE 324's buffer status report indicates that UE 324 is transmitting a small amount of data, which results in a buffer status report or a buffer status below a predetermined buffer status threshold, the UE 324 may be re-directed from connecting to 5G EN-DC non-standalone node 306 to 5G standalone node 302. This re-direction will conserve both resources and power. Described differently, indication receiver 216 will receive an indication that UE 324 is located in the common coverage area 356 where both the 5G standalone node 302's coverage area 308 overlaps with the coverage area 312 of the 5G EN-DC non-standalone node 306. Additionally, the indication receiver 216 will receive an indication that UE 324 has connected to NSA node 306. However, when the BSRR 218 receives a real-time buffer status report that indicates there is low data transmission and the determiner 220 determines that UE 324's buffer status is below a predetermined buffer status threshold, re-director 222 will re-direct UE 324 to disconnect from node 306 and connect to the 5G SA node 302.

The buffer status threshold may be dynamic such that the buffer status threshold determine may vary at different times during the day, based on historical buffer status, and may be different for each UE. Additionally, it is contemplated that in aspects, the system could utilize historical buffer status reports for UE 324 rather than real-time buffer status reports. In this case, based on the historical buffer status reports which indicate whether UE 324 has previously been transmitting high amounts or low amounts of data and previous determinations that one or more buffer statuses for UE 324 are above or below the predetermined buffer status threshold, the re-director 222 can proactively re-direct UE 324 to connect to the 5G SA node 302 before the UE 324 has connected to the 5G EN-DC NSA node 306. This would save more time, resources, and battery life by proactively re-directing the UE 324 by utilizing the historical buffer status reports. This may be beneficial when there are a high number of users present in the sector or connected to the 5G EN-DC NSA node. However, as discussed above, in other instances the dynamic re-direction engine 212 may rely on only the real-time buffer status report or both a real-time buffer status report and a historical buffer status report. Additionally, in aspects, in addition to looking at the buffer status report, the dynamic re-direction engine 212 may also determine how many users are present in the sector and connected to each node.

Additionally, in aspects, each node 302, 304, and 306 comprises one or more antennas 312, 314, and 316. The one or more antennas may be dipole antennas, having a length, for example, of ¼, ½, 1, or 1 ½ wavelength. In aspects, the antenna array may be an active antenna array, FD-MIMO, Massive MIMO, 3G, 4G, 5G, and/or 802.11. While dipole antennas are referred to herein, in other aspects, the antenna may be monopole, loop, parabolic, traveling-wave, aperture, yagi-uda, conical spiral, helical, conical, radomes, horn, and/or apertures, or any combination thereof. It is noted that adjusting one or more individual power supplies to antennas of an antenna array may be broadly applicable to an antenna array comprising any type of antenna targeting any portion of the RF spectrum.

Figure 4:
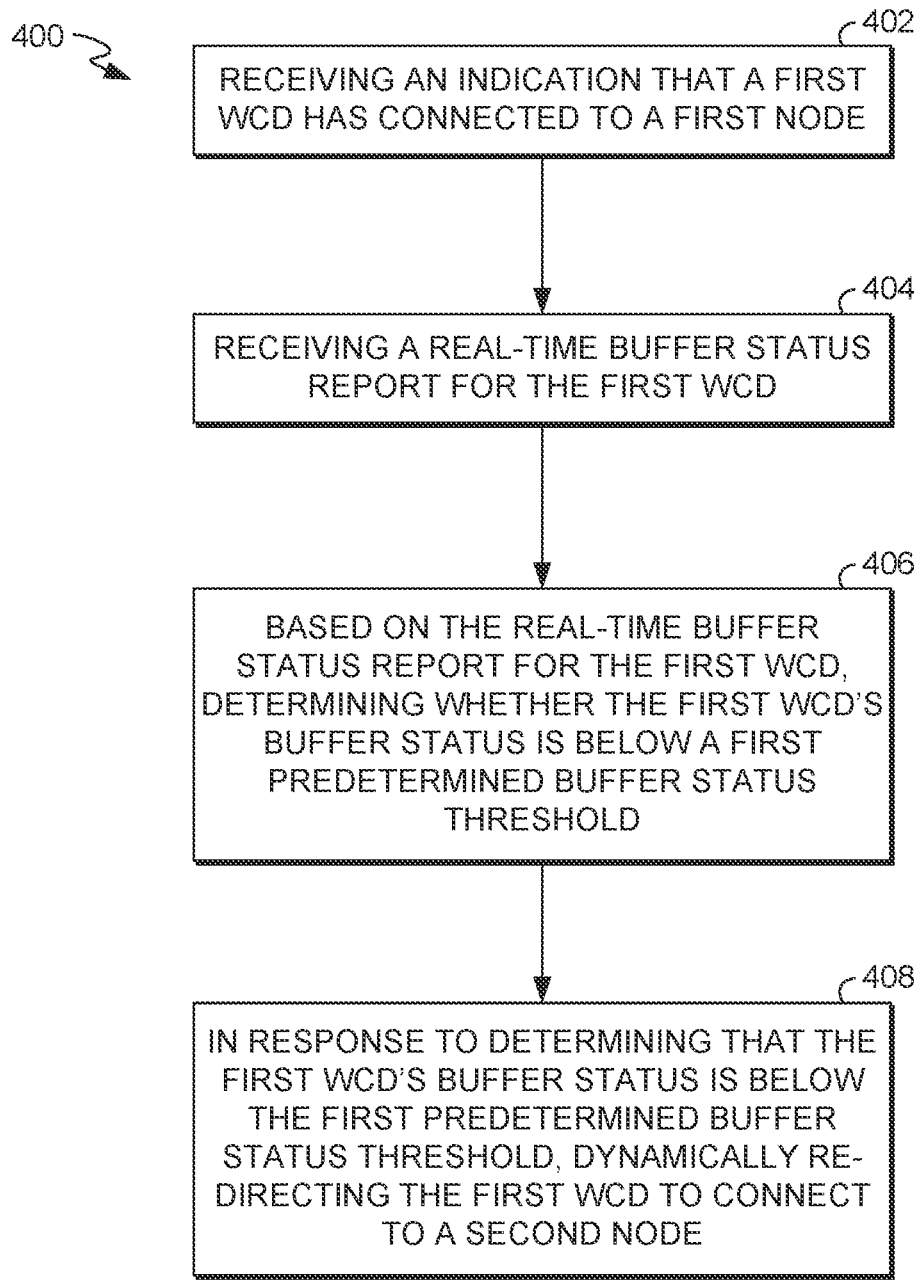
FIG. 4 depicts a flow diagram of a method for re-directing a dual configuration wireless communication device from a first node to a second node, in accordance with aspects herein.

FIG. 4 depicts a flow diagram of an exemplary method 400 for dynamically re-directing a dual configuration wireless communication device or UE. Initially, a block 402, the indication receiver, such as indication receiver 216, receives an indication that a first UE has connected to a first node. Then the BSRR receives a real-time buffer status report for the first UE at block 404. Based on the real-time buffer status report received, the determiner will determine whether the buffer status for the first UE is greater than or below a predetermined first buffer status threshold at block 406. As mentioned, the BSRR may determine what the predetermined first buffer status threshold is. However, it is contemplated that in other instances other components, such as the determiner may determine the buffer status threshold. When the determiner determines that the first UE's Buffer status is below the first predetermined buffer status threshold, the re-director dynamically redirects the first UE to connect to a second node at block 408.

While not shown, in some instances, the method may further include the additional step of determining the amount of data transmitted by the first UE and then determining whether the amount of data transmitted by the first UE is greater or less than a predetermined data transmission threshold value. Based on this determination, the re-director, such as re-director 222, may leave the first UE at the first node or may re-direct the first UE to the second node as previously discussed. Additionally, as discussed, the method may further include receiving a historical buffer status report and utilizing such a report to determine whether the first UE should be redirected from the first node to the second node. In some instances, the method may also include receiving an indication that a second UE is connected to the first node and then receiving a real time buffer status report for the second UE and then subsequently determining whether the second UE should be redirected to the second node based on whether the buffer status of the second UE is above or below the second predetermined buffer status threshold value for the second UE.

Even though the disclosure explicitly discuses instances in which two UEs have connected to the first node, it is contemplated that that the indication receiver may receive any number of indications that several more UEs are connected to the first node. Similarly, the BSRR may receive several more real-time buffer status reports for each additional UE detected connected to the first node in the coverage area and the re-director may re-direct, as appropriate, additional UEs from the first node to the second node.

Moreover, it is also contemplated that in instances, the indication receiver may instead first receive an indication that a UE has connected to the second SA node first, rather than the first NSA node. This instance may occur, for example, when the first node is overloaded with users and the specific UE initially connects to the second node. In this instance, the BSRR 218 may similarly receive a real time buffer status report for the UE on the second node and then determine whether the UE's buffer status is below or above the predetermined buffer status threshold for that UE. Based on the determination made by the determiner, the re-director may leave the UE on the second node or may re-direct the UE in the opposite manner than previously discussed, from the second SA node to the first NSA node.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A system for dynamically re-directing a user equipment (UE) such as a dual configuration wireless communication device, the system comprising:
   a first node configured to wirelessly communicate with one or more UEs in a geographic service area; and
   one or more processors configured to perform operations comprising:
   receiving an indication that a first UE is connected to the first node;
   receiving a real-time buffer status report for the first UE;
   based on the real-time buffer status report for the first UE, determining whether the first UE's buffer status is below a first predetermined buffer status threshold; and
   in response to determining that the first UE's buffer status is below the first predetermined buffer status threshold, dynamically re-directing the first UE to connect to a second node, wherein the second node utilizes a 5G second wireless communication protocol.

2. The system of claim 1, wherein the first node is a non-standalone node.

3. The system of claim 2, wherein the non-standalone node utilizes a first wireless communication protocol.

4. The system of claim 3, wherein the first wireless communication protocol is 5G EN-DC. node.

5. The system of claim 1, wherein the second node is a standalone node.

6. The system of claim 1, wherein the one or more processors are further configured perform operations comprising:
   determining an amount of data transmitted by the first UE;
   determining a predetermined data transmission threshold value; and
   determining that the amount of data transmitted by the first UE is below the predetermined data transmission threshold value.

7. The system of claim 1, wherein the one or more processors are further configured to perform operations comprising:
   receiving an indication that a second UE has connected to the first node;
   receiving a real-time buffer status report for the second UE;
   based on the real-time buffer status report for the second UE, determining whether the second UE's buffer status is below a second predetermined buffer status threshold; and
   in response to determining that the second UE's buffer status is above the second predetermined buffer status threshold, directing the second UE to remain connected to the first node.

8. The system of claim 1, wherein redirecting the first UE to the second node lengthens a battery life of the first UE.

9. The system of claim 1, wherein the first node has a greater signal strength than the second node.

10. The system of claim 1, wherein the one or more processors are further configured to receive at least one historical buffer status report for the first UE.

11. A method for dynamically re-directing user equipment (UE), such as a dual configuration wireless communication device, the method comprising:
   receiving an indication that a first UE has connected to a first node;
   receiving a real-time buffer status report for the first UE;
   based on the real-time buffer status report for the first UE, determining whether the first UE's buffer status is below a first predetermined buffer status threshold;
   in response to determining that the first UE's buffer status is below the first predetermined buffer status threshold, dynamically re-directing the first UE to connect to a second node;
   determining a number of UEs connected to the first node;
   receiving an indication that a second UE has connected to the first node;
   receiving a real-time buffer status report for the second UE;
   based on the real-time buffer status report for the second UE, determining whether the second UE's buffer status is above a second buffer status predetermined threshold; and
   in response to determining that the second UE's buffer status is above the second buffer status predetermined threshold, directing the second UE to remain connected to the first node.

12. The method of claim 11, wherein the first predetermined buffer status threshold and the second buffer status predetermined threshold are the same.

13. The method of claim 11, wherein the first predetermined buffer status threshold and the second buffer status predetermined threshold are different.

14. A system for dynamically re-directing user equipment (UE), such as a dual configuration wireless communication device, the system comprising:
   a first non-standalone configured to wirelessly communicate with one or more UEs in a geographic service area;
   one or more processors configured to perform operations comprising:
   receiving an indication that a first UE has connected to the first non-standalone node;
   determining that one or more additional UEs are connected to the first non-standalone node at the same time that the first UE is connected to the first non-standalone node;
   calculating a total number of UEs connected to the first non-standalone node;
   determining that the total number of UEs connected to the first non-standalone node is above a predetermined load threshold for the first non-standalone node;
   receiving a historical buffer status report for the first UE;
   determining whether the first UE's buffer status from the historical buffer status report is below a first predetermined buffer status threshold; and
   in response to determining that the first UE's buffer status is below the first predetermined buffer status threshold, dynamically re-directing the first UE to connect to a second standalone node.

15. The system of claim 14, wherein the historical buffer status report for the first UE indicates data transmitted from the first UE's is below a predetermined data threshold value.

16. The system of claim 14, wherein the first non-standalone node and the second standalone node are located within a common coverage area.

* * * * *